US012479077B2

(12) United States Patent
Bohn et al.

(10) Patent No.: US 12,479,077 B2
(45) Date of Patent: Nov. 25, 2025

(54) PORTABLE POWER TOOL

(71) Applicant: Hilti Aktiengesellschaft, Schaan (LI)

(72) Inventors: Klaus-Peter Bohn, Schaan (LI); Markus Hartmann, Mauerstetten (DE); Carsten Peters, Sax (CH); Maria Zivcec, Buchs (CH); Donato Clausi, Arlesheim (CH)

(73) Assignee: Hilti Aktiengesellschaft, Schaan (LI)

( * ) Notice: Subject to any disclaimer, the term of this patent is extended or adjusted under 35 U.S.C. 154(b) by 758 days.

(21) Appl. No.: 17/312,093

(22) PCT Filed: Dec. 13, 2019

(86) PCT No.: PCT/EP2019/085123
§ 371 (c)(1),
(2) Date: Jun. 9, 2021

(87) PCT Pub. No.: WO2020/126924
PCT Pub. Date: Jun. 25, 2020

(65) Prior Publication Data

US 2022/0024013 A1 Jan. 27, 2022
US 2022/0371171 A9 Nov. 24, 2022

(30) Foreign Application Priority Data

Dec. 21, 2018 (EP) .................................... 18215552

(51) Int. Cl.
*B25D 11/12* (2006.01)
*B25D 17/04* (2006.01)

(52) U.S. Cl.
CPC .......... *B25D 11/125* (2013.01); *B25D 17/043* (2013.01); *B25D 2217/0015* (2013.01); *B25D 2250/095* (2013.01)

(58) Field of Classification Search
CPC .... B25D 11/125; B25D 17/06; B25D 17/043; B25D 2217/0015; B25D 2250/095
See application file for complete search history.

(56) References Cited

U.S. PATENT DOCUMENTS 1,167,975 A * 1/1916 Burlingham .............. E02D 7/10 173/127
3,746,073 A * 7/1973 Schmuck ............... B22D 13/06 65/302

(Continued)

FOREIGN PATENT DOCUMENTS

CN 202163494 U 3/2012
CN 103538032 A 1/2014

(Continued)

OTHER PUBLICATIONS

International Search Report of PCT/EP2019/085123, dated Mar. 4, 2020.

*Primary Examiner* — Thanh K Truong
*Assistant Examiner* — David G Shutty
(74) *Attorney, Agent, or Firm* — Davidson Kappel LLC

(57) ABSTRACT

A portable power tool has a tool holder 2, a motor 8 and an electro-pneumatic striking mechanism 4. The striking mechanism includes an excitation piston 13, a striker 14, a pneumatic chamber 18 for coupling the striker 14 to the excitation piston 13 and an anvil 15 which is arranged in the striking direction 5 downstream of the striker 14 and is provided for transmitting a blow of the striker to the tool. The anvil is hollow. The hollow interior space 23 is closed in the striking direction 5 and counter to the striking direction 5.

13 Claims, 2 Drawing Sheets

(56) References Cited

U.S. PATENT DOCUMENTS

| | | | | | |
|---|---|---|---|---|---|
| 3,965,968 | A * | 6/1976 | Alexandrov | B22D 13/00 | 164/293 |
| 4,567,951 | A * | 2/1986 | Fehrle | B25D 17/245 | 173/117 |
| 5,603,516 | A * | 2/1997 | Neumaier | B23Q 3/12 | 279/19.5 |
| 5,775,441 | A * | 7/1998 | Sakuragi | B25D 17/245 | 173/122 |
| 5,871,059 | A * | 2/1999 | Shibata | B25D 11/125 | 173/133 |
| 5,954,457 | A | 9/1999 | Stoeck et al. | | |
| 6,923,271 | B2 * | 8/2005 | Frauhammer | B25D 17/06 | 173/132 |
| 6,938,705 | B2 * | 9/2005 | Kikuchi | B25D 11/005 | 173/210 |
| 7,252,155 | B2 * | 8/2007 | Goetzfried | B23B 51/042 | 173/132 |
| 7,628,221 | B2 | 12/2009 | Hartmann | | |
| 7,694,750 | B2 * | 4/2010 | Tsubakimoto | B25D 17/06 | 173/13 |
| 7,921,933 | B2 * | 4/2011 | Hamano | B25D 17/06 | 173/205 |
| 9,102,044 | B2 * | 8/2015 | Hartmann | B25D 17/06 | |
| 2003/0098168 | A1 * | 5/2003 | Frauhammer | B25D 17/06 | 173/47 |
| 2003/0221847 | A1 | 12/2003 | Funfer et al. | | |
| 2006/0237206 | A1 * | 10/2006 | Schamberger | B25D 17/06 | 173/128 |
| 2009/0283285 | A1 | 11/2009 | Randa et al. | | |
| 2013/0025895 | A1 * | 1/2013 | Friedrich | B25D 17/06 | 173/133 |
| 2014/0014383 | A1 | 1/2014 | Wiedner et al. | | |
| 2017/0355070 | A1 * | 12/2017 | Ohlendorf | B25D 11/062 | |

FOREIGN PATENT DOCUMENTS

| | | | | | |
|---|---|---|---|---|---|
| CN | 105113507 | A | 12/2015 | | |
| CN | 107215442 | A | 9/2017 | | |
| CN | 206600146 | U | 10/2017 | | |
| CN | 207154920 | U | 3/2018 | | |
| DE | 10209293 | A1 | 9/2003 | | |
| EP | 0 841 127 | A2 | 5/1998 | | |
| EP | 1 955 823 | A1 | 8/2008 | | |
| EP | 2002938 | A2 | 12/2008 | | |
| FR | 374923 | A | 6/1907 | | |
| FR | 390420 | A | * | 10/1908 | B25D 11/005 |
| WO | WO 2012/094800 | A1 | 7/2012 | | |

* cited by examiner

PORTABLE POWER TOOL

FIELD OF THE INVENTION

The present invention relates to a portable power chiseling tool, for example a hammer drill or an electric chisel.

BACKGROUND

An electro-pneumatic hammer drill is known, for example, from EP 1 955 823 A1. The hammer drill has an anvil which is hollow in the direction of a striker. The striker can fly into the cavity of the anvil and can strike against the anvil in the cavity.

A hammer drill is known, for example, from EP 0 841 127 A2. The hammer drill contains an electro-pneumatic striking mechanism which, during operation, repetitively exerts blows against a chisel or drill bit guided in a tool holder. The striking mechanism has an exciter piston, a striker and an anvil following one another in the striking direction. The exciter piston and the striker convert the driving energy of a motor into the blows. The anvil is arranged between the striker and chisel in order to seal the striking mechanism against dust. The striker strikes periodically against one side of the stationary anvil. The impact passes through the anvil and is transmitted, preferably without thermal losses, to the tool pressed against the other side.

The pair consisting of striker and anvil has an influence on the dynamic behavior of the blow and on the impact passing through the anvil. The blow does not take place instantaneously, but rather the striker makes contact with the anvil for a short (contact) period. During the contact period, some of the kinetic energy of the striker is transmitted as an impact to the anvil and the striker recoils elastically. The contact period tends, inter alia, to decrease for relatively light anvils and likewise tends to decrease for relatively short anvils. Reciprocally, the amplitude of the impact increases under the same striking energy. In particular in the case of striking mechanisms having high striking energies, this leads to high material loadings of striker and anvil. Use is therefore typically made of heavy and long anvils which promise a longer contact period, irrespective of the associated ergonomic disadvantages of heavy anvils.

The contact period also has an influence on the degradation performance realizable by a user. A greater degradation performance tends to be achieved with increasing striking energy. However, the user seems to profit more from the increasing striking energy if the blow has a moderate amplitude and for this purpose is extended in time.

SUMMARY OF THE INVENTION

The portable power tool according to the invention has a tool holder for holding a tool on a working axis, a motor and a striking mechanism. The striking mechanism includes an exciter piston coupled to the motor, a striker guided on the working axis, a pneumatic chamber which is closed by the exciter piston and the striker and is provided for coupling a movement of the striker to the exciter piston, and an anvil which is arranged in the striking direction downstream of the striker and is provided for transmitting a blow of the striker to the tool. An interior space is arranged in the anvil.

According to the invention, the interior space is closed. The impact can flow in the striking direction in a wall around the interior space without being dispersed to openings in the wall. The interior space is furthermore closed in the striking direction and counter to the striking direction in order to absorb the blow of the striker and to transmit the impact to the tool. The interior space extends the contact period of striker and anvil in comparison to a solid anvil of identical design.

The anvil has a wall surrounding the interior space circumferentially. In one embodiment, the wall is inclined in relation to the anvil axis. The inclined wall acts in the manner of a disk spring. The circumferentially surrounding wall can have a constant thickness.

The anvil has a striking surface which faces the striker and is provided for receiving the blow of the striker. In one refinement, a maximum cross section of the interior space perpendicular to the striking direction is larger than the striking surface.

BRIEF DESCRIPTION OF THE DRAWINGS

The following description explains the invention on the basis of exemplary embodiments and figures, in which.

Identical or functionally identical elements are indicated by the same reference signs in the figures unless specified otherwise.

DETAILED DESCRIPTION

Figure 1:
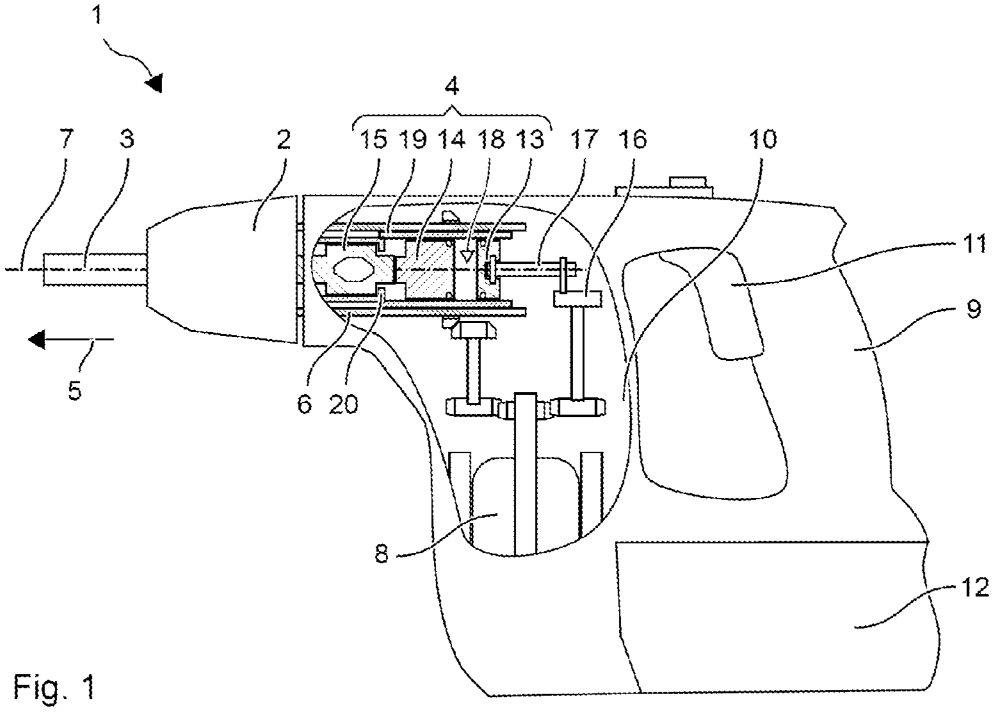
FIG. 1 shows a hammer drill.

FIG. 1 schematically shows a hammer drill as an example of a portable power chiseling tool 1. The hammer drill has a tool holder 2 into which a tool 3 can be inserted and locked. The tools 3 can be, for example, drill bits for chiseling mineral construction materials, such as concrete or rock, by turning, or chisels for purely chiseling the same construction materials. The hammer drill 1 contains a pneumatic striking mechanism 4, which, during operation, periodically exerts blows in the striking direction 5 on the tool 3. In addition, the hammer drill 1 contains an output shaft 6, which, during operation, rotates the tool holder 2 and therefore the tool 3 about a working axis 7. The striking mechanism 4 and the output shaft 6 are driven by a motor 8, for example, an electric motor. The output shaft 6 can be switched off in portable power chiseling tools 1 or in purely chiseling portable power tools 1 are without an output shaft.

The portable power tool 1 has a handle 9 with which the user can hold and guide the portable power tool 1 during operation. The handle 9 is fastened to a machine housing 10. The handle 9 is preferably arranged at an end of the portable power tool 1 or of the machine housing 10 that is remote from the tool holder 2. A working axis 7 running parallel to the striking direction 5 and centrally through the tool holder 2 preferably runs through the handle 9 when the latter has to be grasped by one hand. The handle 9 can be partially decoupled from the machine housing 10 by damping elements in order to damp vibrations of the striking mechanism 4.

The user can put the portable power tool 1 into operation by means of a switch 11. Actuation of the switch 11 activates the motor 8. The switch 11 is preferably arranged on the handle 9, as a result of which the latter can be actuated by the hand grasping the handle 9. The motor 8 can be supplied with energy, for example, by means of a battery 12 which is arranged on the portable power tool 1.

The striking mechanism 4 has an exciter piston 13, a striker 14 and an anvil 15. The exciter piston 13, the striker 14 and the anvil 15 are arranged lying on the working axis 7 following one another in the striking direction 5. The exciter piston 13 is coupled to the motor 8 via a gear train. The gear train converts the rotational movement of the motor 8 into a periodic forward and back movement of the exciter piston 13 on the working axis 7. An exemplary gear train is based on an eccentric gear 16 and a connecting rod 17. Another design is based on a wobble drive.

The striker 14 is coupled to the movement of the exciter piston 13 by a pneumatic chamber 18, also referred to as an air spring. The pneumatic chamber 18 is closed along the working axis 7 by the exciter piston 13 on the drive side and by the striker 14 on the tool side. For this purpose, the striker 14 is in the form of a piston. In the variant illustrated, the pneumatic chamber 18 is closed in the radial direction by a guide tube 19. The exciter piston 13 and the striker 14 slide in an air-tight manner lying against the inner surface of the guide tube 19. In another refinement, the exciter piston can be designed in the form of a cup. The striker slides within the exciter piston. The striker can analogously be designed in the form of a cup, with the exciter piston sliding within the striker. The striker 14, coupled via the pneumatic chamber 18, periodically moves parallel to the striking direction 5 between a drive-side reversing point and a tool-side reversing point. The tool-side reversing point is predetermined by the anvil 15 against which the striker 14 strikes in the tool-side reversing point.

The anvil 15 is guided movably parallel to the striking direction 5 between a stop 20 and the tool 3. During operation, when the tool 3 is pressed against a base, the user pushes the tool 3 against the anvil 15 and indirectly pushes the anvil 15 against the stop 20. The position of the anvil 15 lying against the stop 20 is referred to as the working position. The striker 14 strikes against the anvil 15 preferably when the anvil 15 is in the working position. The anvil 15 serves to pass the blow of the striker 14 onto the tool 3. Damping of the impact by the anvil 15 is not desirable.

The anvil axis 21 (see, e.g, FIG. 2) is introduced into the description of the anvil 15. The anvil axis 21 is parallel to the striking direction 5 and runs through the center of gravity S of the anvil 15. The anvil axis 21 typically coincides with the working axis 7. Unless specified otherwise, the directional details, such as radially and axially, refer to the anvil axis 21; radial dimensions and diameters are determined perpendicular to the anvil axis 21, and a cross section refers to a plane perpendicular to the anvil axis 21.

Figure 2:
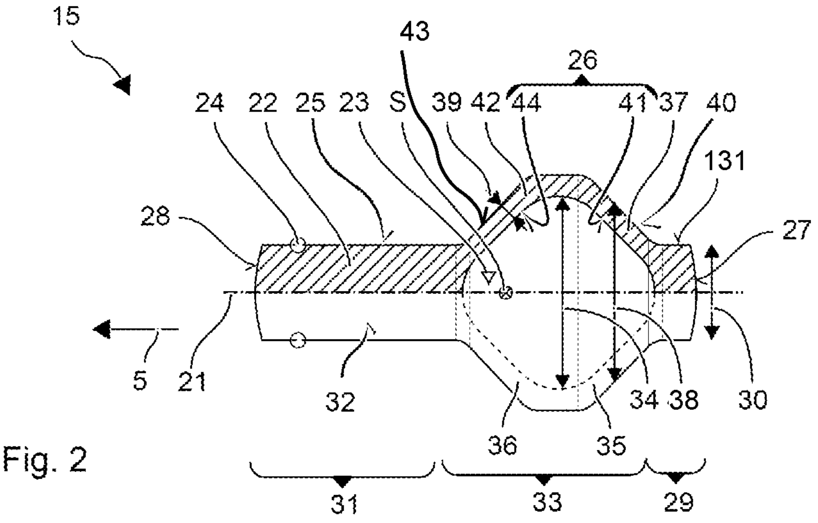
FIG. 2 shows an anvil of the hammer drill.

An exemplary embodiment of the anvil 15 is illustrated in FIG. 2. The anvil 15 has a body 22, an interior space 23 and optionally sealing rings 24. The body 22 is a single-part body, preferably a metallic body. One or more sealing rings 24 can surround the body 22. If smaller components, such as, for example, the sealing rings 24 mentioned, are disregarded, the body 22 defines the external design of the anvil 15. An outer surface 25 of the body 22 substantially corresponds to the outer surface of the anvil 15.

The body 22 is a closed vessel which surrounds the interior space 23. The interior space 23 is bounded by an inner surface 26 of the body 22. The volume delimited by the inner surface 26 preferably corresponds to the volume of the interior space 23. The interior space 23 can be hollow. The hollow interior space 23 is filled with a gas, for example air. The body 22 and the interior space 23 are preferably formed in a rotationally symmetrical manner with respect to the anvil axis 21.

Although the design of the body 22, in particular the outer surface 25 and the inner surface 26, are described below in a manner divided into different regions for simpler characterization, the body 22 is a single-part, cohesive body. The body 22 is typically formed continuously from the same material, for example a metal, preferably from steel. The body 22 can be assembled from a plurality of parts; in particular individual parts can be welded, soldered or adhesively bonded to one another. However, the body 22 is preferably formed monolithically. Monolithically is understood as meaning that the body 22 does not have any joining areas. In particular, no mechanical joining areas with mutually adjacent surfaces of the parts, material-bonding joining areas which arise by welding, soldering or adhesive bonding. The joining areas typically age rapidly because of the high loadings during the transfer of the impact within the anvil 15.

The body 22 has two end surfaces which lie on the anvil axis 21. One of the two end surfaces faces the striker 14; said end surface is referred to below as the striking surface 27. The other end surface faces away from the striker 14 and is referred to below as the impact surface 28. During the striking operation, the striker 14 strikes against the striking surface 27 and the impact surface 28 lies against the tool 3.

The body 22 can have a cylindrical section 29 which is directly adjacent to the striking surface 27. The striking surface 27 forms the exposed roof surface of the cylindrical section 29. The diameter of the cylindrical section 29 is identical to the diameter 30 of the striking surface 27. The body 22 can analogously have a cylindrical section 31 which is directly adjacent to the impact surface 28. Corresponding to the striking surface 27 and impact surface 28, the diameters of the two cylindrical sections 29, 31 can be identical or different. The two cylindrical sections 29, 31 can differ or be identical in length. The anvil 15 is typically guided on at least one of the cylindrical lateral surfaces 32 of the cylindrical sections 29, 31. The cylindrical sections 29, 31 are preferably solid.

Between the striking surface 27 and the impact surface 28, the interior space 23 is arranged in a manner lying on the anvil axis 21. The interior space 23 influences the characteristics of the anvil 15 in the striking mode. The interior space 23 is preferably compressible. When the striker 14 strikes against the striking surface 27, a striker-side section of the anvil 15 can spring into the interior space 23. This increases the contact duration of the striker 14 with the anvil 15, and a more gentle transmission of the striking energy of the striker 14 to the anvil 15 is made possible.

The striking surface 27 is an end surface of the body 22 that is substantially perpendicular to the anvil axis 21. The striking surface 27 can be flat. The striking surface 27 is preferably continuously concave. A radius of curvature of the striking surface 27 is typically greater than the length of the anvil 15. The dome-shaped design of the striking surface 27 is also referred to as spherical. The striking surface 27 is typically the surface protruding furthest in the direction of the striker 14. The impact surface 28 is formed analogously to the striking surface 27. The impact surface 28 can be flat or spherical. The impact surface 28 typically protrudes furthest in the striking direction 5. In the embodiment illustrated, the striking surface 27 and the impact surface 28 delimit the length of the anvil 15. Diameter 30 or area of the striking surface 27 and of the impact surface 28 can be identical, as illustrated, or different in other embodiments.

The body 22 has a bulge-shaped section 33 which is arranged between the striking surface 27 and the impact surface 28. In the example illustrated, the bulge-shaped section 33 is arranged between the two cylindrical sections 29, 31. The bulge-shaped section 33 protrudes in the radial direction in relation to the striking surface 27 and the impact surface 28. The bulge-shaped section 33 can carry a number of functions. The bulge-shaped section 33 can be provided for lying against the stop 20.

The interior space 23 is largely, preferably completely, arranged in the bulge-shaped section 33 which preferably has a larger diameter than the striking surface 27, the impact surface 28 and the cylindrical sections 29, 31. An inside diameter 34 of the interior space 23 is preferably identical to or larger than the diameter of the striking surface 27. The entire striking surface 27 can spring along the anvil axis 21 into the interior space 23 virtually without internal deformation. The inside diameter 34 can furthermore also be larger than the diameter of the striking surface 27. The volume of the interior space 23 shares at least 30%, for example at least 40%, of the volume of the anvil 15.

The exemplary bulge-shaped section 33 can have a first shell-shaped section 35 at an axial end closer to the striking surface 27 and can have a second shell-shaped section 36 at an axial end closer to the impact surface 28. The interior space 23 lies between the shell-shaped sections 35, 36. The shell-shaped section 35 acts similarly to a disk spring. The disk spring can temporarily store some of the impact energy as elastic work of deformation and can output same again with a delay. The delay can be adapted via the rigidity of the shell-shaped section 35.

The term shell-shaped references the typical shape of a shell. A typical shell has a wall which encircles an axis and is inclined monotonously with respect to the axis and which surrounds a convex cavity in the circumferential direction. The wall is preferably formed in a rotationally symmetrical manner with respect to the axis. The shell is closed at its narrower end by a base along the axis. The base can merge smoothly into the wall. The shell is open in the axial direction at the further end. The opening is bordered by an annular edge of the wall. The shell is a vessel and preferably does not have any radial openings in the base and the encircling wall.

The shell-shaped section 35 has a base and an inclined, encircling wall 37. The base is substantially formed by the striking surface 27 or the cylindrical section 29 belonging to the striking surface 27. The wall 37 is adjacent to the base. The wall 37 encircles the anvil axis 21. The wall 37 is inclined monotonously in relation to the anvil axis 21. The inclination is such that the diameter 38 of the shell-shaped section 35 increases, preferably increases continuously, at an increasing distance from the striking surface 27.

The embodiment illustrated by way of example has a conical, shell-shaped section 35. The wall 37 is rotationally symmetrical with respect to the anvil axis 21. The inclination of the wall 37 in relation to the anvil axis 21 is constant. In other embodiments, the shell-shaped section can be formed with a bulge. The inclination of the wall with the bulge decreases in relation to the anvil axis 21 at an increasing distance from the anvil axis 21. In a further embodiment, the shell-shaped section can be trumpet-shaped. The inclination of the trumpet-shaped wall decreases in relation to the anvil axis 21 at an increasing distance from the anvil axis 21.

An inclination of the wall 37 in relation to the anvil axis 21 is preferably within a range of between 30 degrees and 60 degrees. A greater inclination reduces the rigidity of the shell-shaped section 35, as a result of which a greater delay can be achieved.

The rigidity of the shell-shaped section 35 and the delay can furthermore be adapted by the wall thickness 39 of the wall 37. A smaller wall thickness 39 results in less rigidity. The wall thickness can be constant. In alternative embodiments, a cross-sectional surface of the shell-shaped section 35 is constant; the wall thickness is reduced as the diameter 30 of the shell-shaped section 29 increases. In other embodiments, the wall thickness 39 can increase toward the further end of the shell-shaped section 35.

The wall 37 of the shell-shaped section 35 forms an annular outer surface 40 which is inclined in relation to the anvil axis 21. The outer surface 40 faces the striker 14. The outer surface 40 can lie against the stop 20 in the working position. The outer surface 40 preferably has no openings. An inclination of the outer surface 40 is preferably between 30 degrees and 60 degrees. The inclination is preferably constant; the inclined outer surface is conical. Furthermore, the inclination can vary along the anvil axis 21. The inclined outer surface 40 merges into the striking surface 27 or into a cylindrical outer surface 131 of the cylindrical section 31.

The wall 37 of the shell-shaped section 35 forms an inner surface 41 which delimits part of the interior space 23 of the body 22. The inner surface 41 is inclined monotonously in relation to the anvil axis 21. The inclination of the inner surface 41 can be constant along the anvil axis 21. In other embodiments, the inclination varies along the anvil axis 21. For example, the inclination can decrease at an increasing radial distance from the anvil axis 21. An inclination of the inner surface 41 is preferably within the range of between 30 degrees and 60 degrees. The inside diameter 34 of the inner surface 41 is larger than the diameter 30 of the striking surface 27.

The shell-shaped section 36 closer to the impact surface 28 is formed analogously to the shell-shaped section 35 closer to the striking surface 27. The shell-shaped section 36 has an inclined wall 42 which defines an outer surface 43 and an inner surface 44. The inclination of the two walls 37, 42 can be identical or different.

The two shell-shaped sections 35, 36 can be directly adjacent to each other. The interior space 23 of the anvil 15 is closed by the two inner surfaces 41, 44. In another embodiment, an annular section 45 can be arranged between the shell-shaped sections 35, 36. The annular section connects the two shell-shaped sections 35, 36. The interior space 23 is closed by the shell-shaped sections 35, 36 and the optional annular section. The interior space 23 of the anvil 15 is closed by the two inner surfaces 41, 44 of the shell-shaped sections 35, 36 and an inner surface of the annular section.

Figure 3:
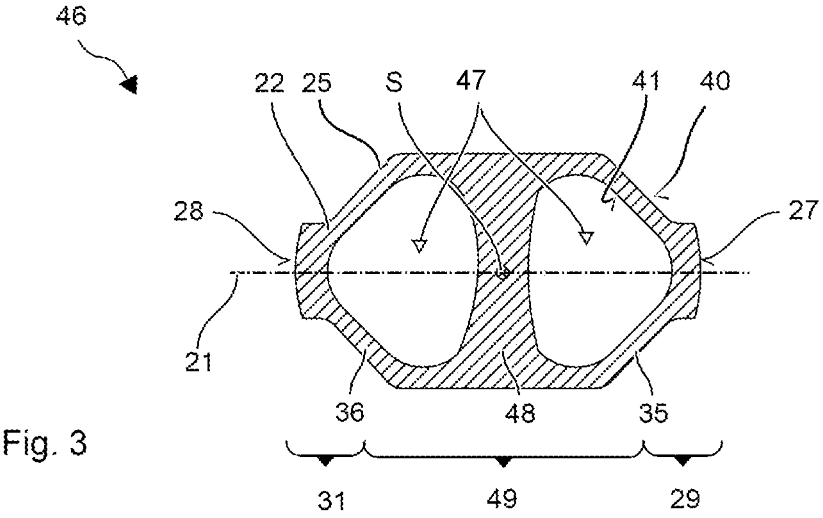
FIG. 3 shows an anvil of the hammer drill.

A further refinement of an anvil 46 is illustrated in FIG. 3. The anvil 46 has a striking surface 27, an impact surface 28, a shell-shaped section 35 closer to the striking surface 27 and a shell-shaped section 36 closer to the impact surface 28. For the description, reference is made to the elements having the same reference signs of the preceding exemplary embodiment.

The anvil 46 has a two-part interior space 47. A disk 48 is arranged between the first shell-shaped section 35 and the second shell-shaped section 36. The disk 48 is preferably solid. The disk 48 preferably has a cylindrical outer surface, the outside diameter of which is identical to the adjacent shell-shaped sections 35, 36.

In the case of the anvil 15 of FIG. 2, the cylindrical sections 29, 31 lying on the outer side along the anvil axis 21 contribute to a very large amount to the mass of the anvil 15. The central, bulge-shaped section 33 contributes only a little to the mass of the anvil 15 because of the hollow interior space 23. The mass distribution has proven unfavorable for the impact behavior and reverberation of the anvil 15 after a blow. The disk 48 in the bulge-shaped section 49 of FIG. 3 increases the mass portion close to the center of gravity S of the anvil 15 in order to improve the dynamic behavior of the anvil 15.

Figure 4:
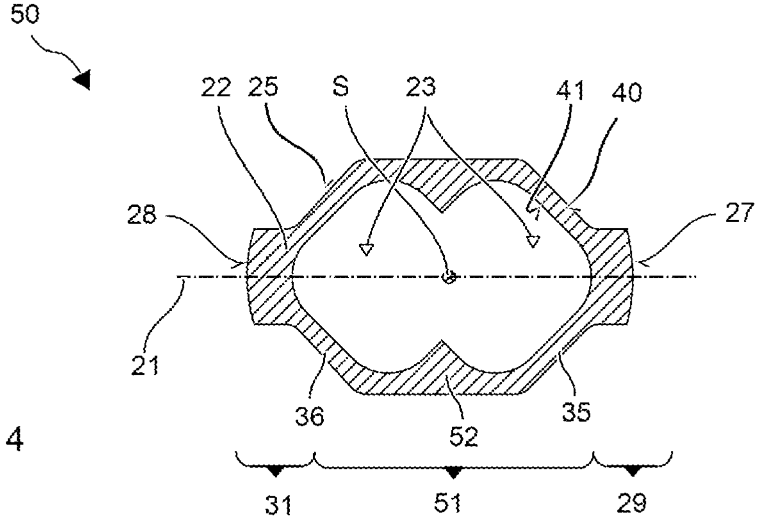
FIG. 4 shows an anvil of the hammer drill.

A further embodiment of the anvil 50 is illustrated in FIG. 4 which takes up the concept of a disk 48, but without dividing the interior space 23. An annular section 51 is arranged between the two shell-shaped sections 35, 36. A wall 52 has a varying wall thickness 39 which decreases continuously at an increasing distance from the center of gravity S of the anvil 15.

The interior space 23 is preferably predominantly filled with a gas or gas mixture, for example air. The gas occupies at least 75% of the volume of the interior space 23. The interior space 23 is preferably filled completely with the gas.

What is claimed is:

1. A portable power chiseling tool comprising:

a tool holder for holding a tool on a working axis;

a motor;

a striking mechanism having an exciter piston coupled to the motor, a striker guided on the working axis, a pneumatic chamber closed by the exciter piston and the striker for coupling a movement of the striker to the exciter piston, and an anvil arranged in a striking direction downstream of the striker for transmitting a blow of the striker to the tool, the anvil having a body surrounding an interior space closed in the striking direction and counter to the striking direction, the body being monolithic; and wherein the body has a varying wall thickness decreasing continuously at an increasing distance from a center of gravity of the anvil.

2. The portable power tool as recited in claim 1 wherein the interior space is filled with air.

3. The portable power tool as recited in claim 1 wherein the anvil has a striking surface facing the striker for receiving the blow of the striker, and a maximum hollow cross section of the interior space perpendicular to the striking direction is larger than the striking surface.

4. The portable power tool as recited in claim 1 wherein a volume of the interior space shares at least 30% of the volume of the anvil.

5. The portable power tool as recited in claim 1 wherein the anvil has an anvil axis running through a striking surface facing the striker and an impact surface facing the tool, the interior space being rotationally symmetrical with respect to the anvil axis.

6. The portable power tool as recited in claim 1 wherein the center of gravity of the anvil is within the interior space.

7. The portable power tool as recited in claim 1 wherein the body has a striking surface facing the striker and an impact surface facing the tool, and having a solid first cylindrical section directly adjacent the striking surface and a solid second cylindrical section directly adjacent the impact surface, the first and second cylindrical sections having different lengths.

8. The portable power tool as recited in claim 1 wherein the body has a striking surface facing the striker and an impact surface facing the tool, the striking surface being spherical.

9. The portable power tool as recited in claim 8 wherein the impact surface is spherical.

10. The portable power tool as recited in claim 1 wherein the body has a striking surface facing the striker and an impact surface facing the tool, the impact surface being spherical.

11. The portable power tool as recited in claim 1 wherein the interior space is compressible.

12. The portable power tool as recited in claim 1 wherein the interior space is a two-part interior space with a disk separating a first section and a second section of the interior space.

13. A portable power chiseling tool comprising:

a tool holder for holding a tool on a working axis;

a motor;

a striking mechanism having an exciter piston coupled to the motor, a striker guided on the working axis, a pneumatic chamber closed by the exciter piston and the striker for coupling a movement of the striker to the exciter piston, and an anvil arranged in a striking direction downstream of the striker for transmitting a blow of the striker to the tool, the anvil having a body surrounding an interior space closed in the striking direction and counter to the striking direction, the body being monolithic; wherein the interior space is a two-part interior space with a disk separating a first section and a second section of the interior space.

* * * * *